United States Patent [19]
Cruse

[11] 3,709,528
[45] Jan. 9, 1973

[54] HOSE COUPLING
[75] Inventor: Lee H. Cruse, Springfield, Mo.
[73] Assignee: Foster Manufacturing Co., Inc., Springfield, Mo.
[22] Filed: April 16, 1971
[21] Appl. No.: 134,701

Related U.S. Application Data
[63] Continuation-in-part of Ser. No. 877,073, Nov. 17, 1969, abandoned.

[52] U.S. Cl.....................................285/316, 285/330
[51] Int. Cl...............................................F16l 37/18
[58] Field of Search......................285/316, 277, 330

[56] References Cited

UNITED STATES PATENTS

| | | | |
|---|---|---|---|
| 2,913,263 | 11/1959 | Zajac | 285/277 |
| 2,972,491 | 2/1961 | Dutton | 285/316 X |
| 2,069,434 | 2/1937 | Eastman | 285/277 X |
| 2,297,548 | 9/1942 | Fox et al. | 285/316 X |
| 3,180,600 | 4/1965 | Kopec | 285/277 X |

FOREIGN PATENTS OR APPLICATIONS

| | | | |
|---|---|---|---|
| 1,029,323 | 3/1953 | France | 285/316 |

*Primary Examiner*—Dave W. Arola
*Attorney*—John D. Pope, III

[57] ABSTRACT

A hope coupling is adapted for receptive engagement with a male coupler element having an external annular groove. The hose coupling includes a tubular body having a longitudinally extending bore adapted to receive the male coupler element. At least one slot in the tubular body provides communication from outside the tubular body to the interior of the longitudinal bore. The slot extends axially along the tubular body and radially inwardly with respect to the longitudinal axis of the bore. A pin is mounted in the slot for movement therein from an inner position wherein it protrudes within the bore to an outer position wherein it is positioned outside the bore. A biasing guide collar for the pin includes oppositely disposed side wall members at the opposite ends of the pin and which collar is slidably mounted on the outside of the tubular body. A spring provided on the tubular body biases the collar to urge the pin into its inner position.

12 Claims, 10 Drawing Figures

PATENTED JAN 9 1973

INVENTOR
LEE H. CRUSE
BY John D. Pope III
ATTORNEY

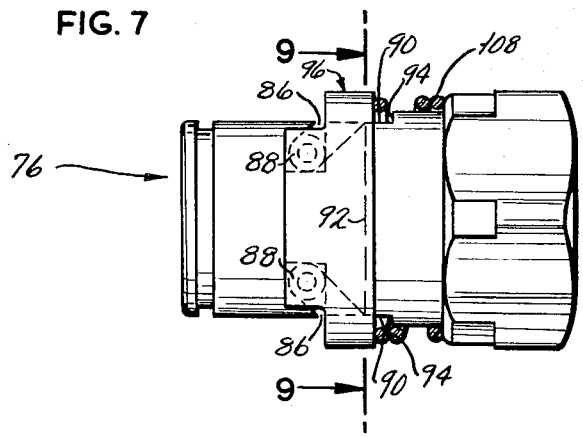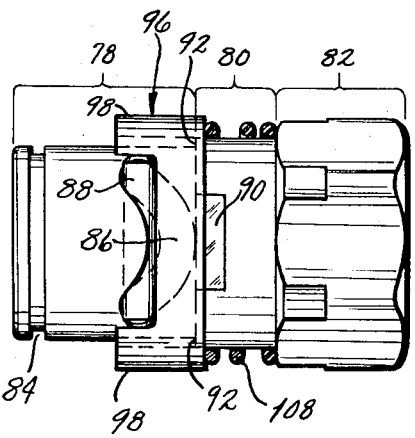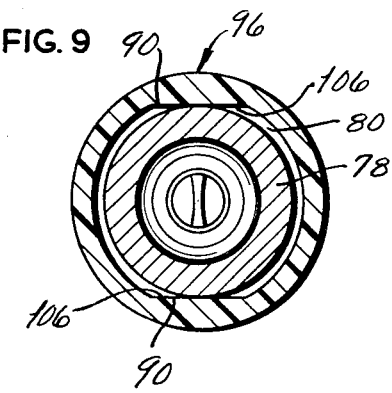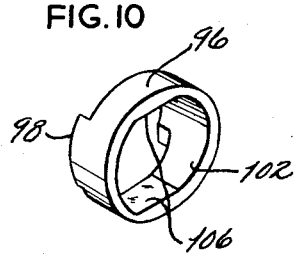

HOSE COUPLING

This is a continuation-in-part of my copending application Ser. No. 877,073, filed Nov. 17, 1969, and now abandoned.

This invention relates to new and useful improvements in hose couplings and more particularly to a guide collar for lockpins provided within the coupling.

Hose couplings are generally used as a shutoff valve or to add a length of fluid conduit to a gas or liquid fluid source. It is well known for hose couplings to employ movable lockpins to establish a quick and secure connection between fluid lines. This pin-type connection can be manually coupled or detached without the use of tools. The pins are generally mounted on a female member for engagement with complementary recessed portions in a male member. A spring-biased movable member on the female member maintains the pins in engagement with the male member.

Detachment of the coupling requires disengagement of the pins from the male member. It is also well known to provide a coupling with a movable actuating sleeve arranged to push against the pins, which pins in turn push against the movable biasing member to overcome the spring bias. In this manner the pins can be moved out of engagement with the male member. Because the actuating sleeve pushes against the pins there is a frictional force between the pins and the sleeve and a frictional force between the pins and the movable biasing member. This frictional force, in addition to the spring bias force, must be overcome when moving the actuating sleeve.

To facilitate movement of the actuating sleeve in detaching a hose coupling from a male member it is desirable to reduce, if not substantially eliminate, any friction between the pins and the sleeve and the pins and the movable biasing member.

Among the several objects of the present invention may be noted the provision of a hose coupling which is simple to operate and which can be easily manipulated to establish a quick, secure, leak-proof connection between two lines; the provision of a hose coupling including means for tightly locking a male coupling within a female coupling so as to prevent accidental disconnection of the two; the provision of a hose coupling which utilizes pins or roller bearings for locking the male coupling within the female coupling; the provision of a hose coupling wherein friction between the pins and sleeve and the pins and a movable guide collar is substantially eliminated; the provision of a novel guide collar forming a track within which pin movement is confined; the provision of a novel guide collar formed to engage the actuating sleeve while substantially shielding the pins from frictional engagement with the sleeve; the provision of a compact hose coupling which requires fewer parts and less material than in previous devices; and the provision of a hose coupling which is economical to manufacture and durable in use. Other objects and features will be in part apparent and in part pointed out hereinafter.

The present invention provides a novel guide collar for biasing lockpins in a hose coupling which coupling includes a movable actuating sleeve. In one embodiment of the invention the guide collar is spring-restrained and includes spaced and oppositely disposed side wall portions forming a track within which the lockpins are confined. The side wall portions have a free end and extend from the collar axially along the coupling such that the distance between the free ends and the collar is greater than the pin diameter dimension. Movement of the actuating sleeve toward the guide collar causes the sleeve to abut the free ends of the wall portions and engagingly move the guide collar against the spring. As the actuating sleeve directly engages the guide collar to overcome spring bias, the pins within the guide collar track become loosely and freely movable with respect to the guide collar. Thus movement of the pins with respect to the guide collar and actuating sleeve is substantially frictionless.

The invention accordingly comprises the constructions hereinafter described, the scope of the invention being indicated in the following claims.

In the accompanying drawings, in which several of various possible embodiments of the invention are illustrated, FIG. 1 is a sectional view of the hose coupling showing the male coupler element in a partially inserted position;

FIG. 7 is an elevational view of a modification of the hose coupling with the outer sleeve removed;

FIG. 8 is a plan view of the modification shown in FIG. 7;

FIG. 9 is a sectional view taken along line 9—9 of FIG. 7; and

FIG. 10 is a perspective view of the sliding collar used with the modification shown in FIGS. 7-9.

Corresponding reference characters indicate corresponding parts throughout the several views of the drawings.

Figure 1:
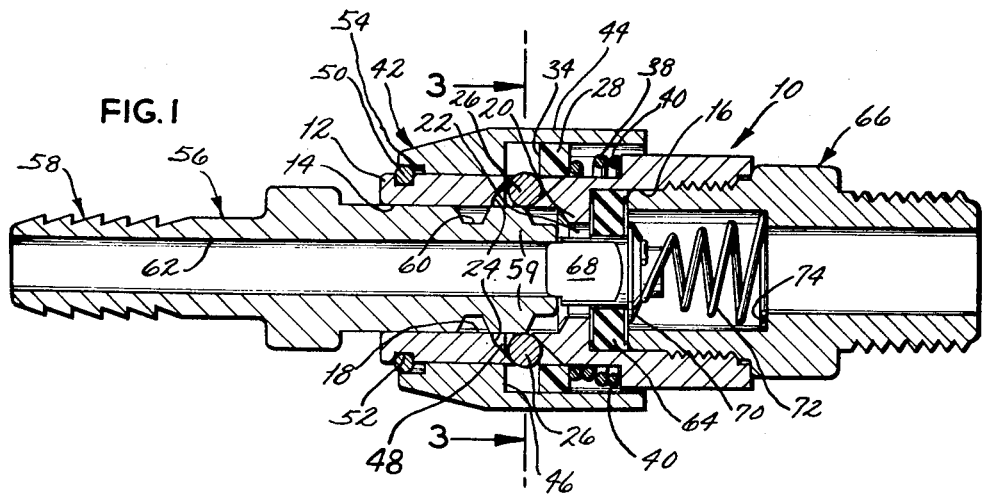
Figure 2:
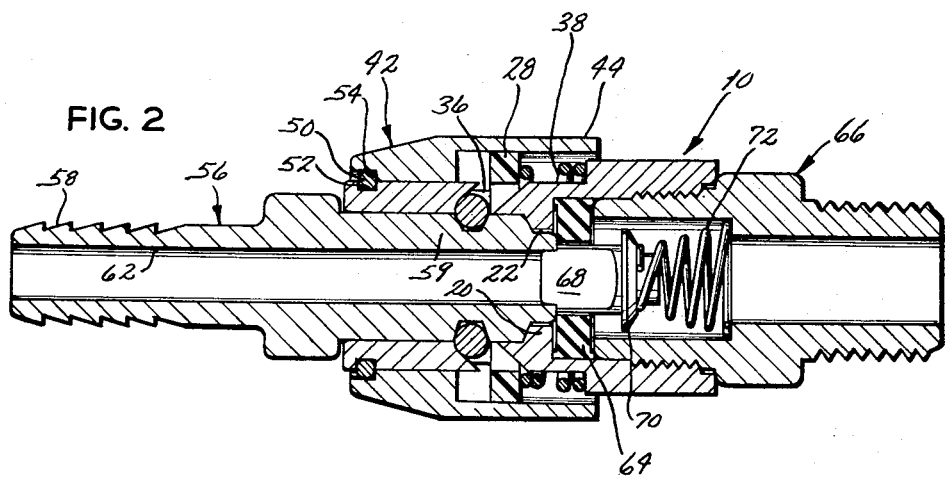
FIG. 2 is a sectional view similar to FIG. 1 showing the male coupler element in a fully inserted position.

A hose coupling 10 includes a tubular body 12 having a longitudinal bore 14 extending therethrough. Bore 14 includes a large cavity 16 at its rear end (the right end as viewed in FIG. 1) and a small cavity 18 at its opposite or forward end. An annular shoulder 20 protrudes radially inwardly within bore 14 between large cavity 16 and small cavity 18, thereby forming a valve opening 22. A pair of slots 24 are cut at an angle through body 12 to provide communication between the outside of body 12 and bore 14. Slots 24 commence at the outer surface of body 12 and slant axially toward the forward end of body 12 and radially inwardly toward the longitudinal axis of bore 14. A pair of elongated pins 26 are movably mounted in slots 24 and are adapted to move therein from an inner position where they protrude within bore 14 to an outer position where they are outside bore 14. The opposite ends of each pin 26 protrude slightly beyond the outer surface of body 12 but the length of each pin 26 is substantially equal to or slightly less than the extreme outer diameter of body 12. When in their inner position pins 26 abut against the innermost ends of slots 24, and when in their outer position they are spaced from the innermost ends of slots 24.

Figure 3:
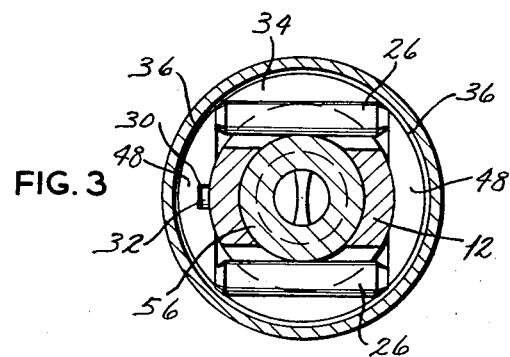
FIG. 3 is a sectional view taken along line 3—3 of FIG. 1.
Figure 4:
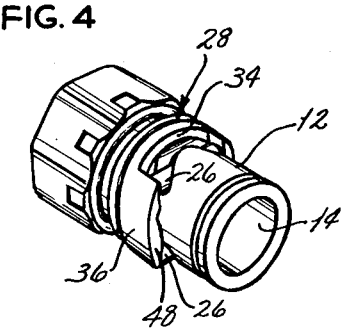
FIG. 4 is a partial perspective view of the hose coupling with the outer sleeve removed.

A circular biasing guide collar 28 surrounds the outer surface of body 12 and is adapted to slide axially thereon. A keyslot 30 (FIG. 3) is keyed over a keypin 32 which protrudes radially outwardly from the outer surface of body 12 so as to prevent rotational movement of guide collar 28 on body 12. Guide collar 28 includes a forwardly presented face 34 which engages the cylindrical surfaces of pins 26 in their inner position within slots 24. A pair of side wall portions 36 extend forwardly from face 34 of collar 28 and embrace the opposite ends of pins 26 so as to limit movement of pins 26 along their longitudinal axis.

Figure 5:
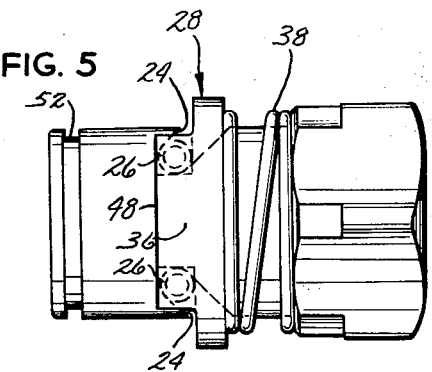
FIG. 5 is a side view of the hose coupling shown in FIG. 4.
Figure 6:
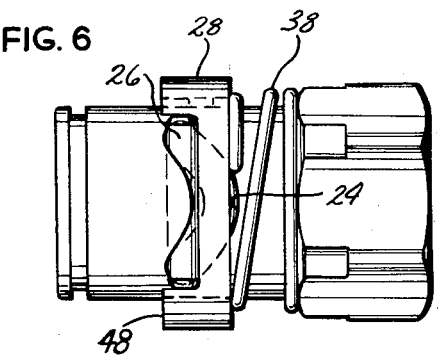
FIG. 6 is a top view of the hose coupling shown in FIG. 4.

Side wall portions 36 extend from face 34 to a forward free end 48, the distance between face 34 and forward end 48 being greater than the diameter of pin 26 as most clearly seen in FIG. 5. Face 34 and side wall portions 36 form a track which extends in a plane normal to the longitudinal axis of bore 14 and which track guides pins 26 as they move between their inner and outer positions in slots 24. A helical spring 38 surrounds body 12 and is compressed between guide collar 28 and a forwardly presented shoulder 40 on body 12. Spring 38 biases guide collar 28 axially forwardly on body 12. This forward biasing of guide collar 28 causes pins 26 to be forced axially forwardly within slots 24. Because slots 24 slant radially inwardly, they cause pins 26 to move to their inner position in response to the forward biasing from spring 38 and collar 28.

An actuating sleeve 42 is slidably mounted around tubular body 12 and is adapted to slide axially thereon. Actuating sleeve 42 includes a cover portion 44 which loosely surrounds and covers guide collar 28 and spring 38. Within actuating sleeve 42 is a rearwardly presented shoulder 46 which faces the forward ends 48 of side wall portions 36 on collar 28. A split ring 50 is inserted in an annular groove 52 adjacent the forward end of body 12 and protrudes slightly radially outwardly therefrom. Split ring 50 is adapted to engage a forwardly presented shoulder 54 at the forward end of actuating sleeve 42 so as to retain sleeve 42 on tubular body 12.

A male coupler element 56 includes a fluted end 58 adapted to be fitted within a hose, and a nose 59 adapted to be inserted within bore 14. Adjacent the tip of nose 59 is an annular locking groove 60, and extending longitudinally through male coupler element 56 is a bore 62.

Within large cavity 62 of bore 14 is an elastomeric washer 64 which abuts against the rearwardly presented face of annular shoulder 20 and which includes an aperture therein which is of the same diameter as bore 62 of male coupler element 56. Threadably inserted within large cavity 16 of bore 14 is a tubular connector 66. A tongue 68 protrudes through the aperture in washer 64 and through valve opening 22. Tongue 68 includes an annular flange 70 which abuts against the rearwardly presented surface of washer 64 so as to limit the forward movement of tongue 68. A spring 72 is compressed between tongue 68 and a forwardly presented shoulder 74 within connector 66 so as to bias tongue 68 in a forward direction. When annular flange 70 is held against washer 64 by spring 72 it seals the opening in washer 64, thereby preventing any line of communication between small cavity 18 and large cavity 16 of bore 14.

Insertion of male coupler element 56 is accomplished by manually pushing it into small cavity 18 of bore 14. Referring to FIG. 1, as nose 59 of male coupler element 56 engages pins 26 it pushes them radially outwardly toward their outer positions. The pressure of spring 38 is such that it will yield in response to the insertion of male coupler 56 so that collar 28 will move axially rearwardly in response to pressure exerted on pins 26. Male coupler element 56 is forced further within bore 14 until its annular groove 60 is in alignment with the extreme inner ends of slots 24. When groove 60 is in this position, pins 26 which are biased toward their inner positions by the force of spring 38 against collar 28 are free to move to their inner positions. Pins 26 can also be moved to their outer positions by manually moving sleeve 42 rearwardly to cause the rearward displacement of collar 28 and pins 26. Sleeve 42 is then released, thereby permitting spring 38 and collar 28 to force pins 26 to their inner position where they snap into groove 60 and lock male coupler element 56 in place. In this locked position there is clearance between shoulder 46 of sleeve 42 and forward end 48 of collar 28. Also in this locked position the inner tip of male coupler element 56 engages tongue 68 and causes it to be displaced rearwardly a short distance against the bias of spring 72, thereby permitting a line of communication from bore 62 into the interior of connector 66. It should also be noted that in this locked position male coupler element 56 cannot be removed from bore 14 because pins 26 are held in their inner position by guide collar 28 responding to the bias of spring 38. While the pressure from spring 38 is only in an axial direction with respect to the longitudinal axis of bore 14, the slant of slots 24 causes pins 26 to be forced radially inwardly as well as axially forwardly by guide collar 28 in response to the axial pressure from spring 38. Removal of male coupler element 56 from bore 14 is accomplished by forcing actuating sleeve 42 rearwardly such that shoulder 46 of sleeve 42 bears against forward end 48 of collar 28. Rearward movement of actuating sleeve 42 against collar 28 overcomes the bias of spring 38, whereby pins 26 are loosely disposed in both the guide collar track and in slots 24 free from any biasing force of spring 38. Further movement of sleeve 42 against collar 28 permits shoulder 46 to displace loosely disposed pins 26 from their inner position within bore 14 to their outer position outside bore 14, thereby freeing male coupler element 56 and permitting its removal.

As pins 26 are loosely disposed in slots 24 and the guide track of collar 28 during movement of sleeve 42 against collar 28, frictional forces between sleeve 42 and pins 26, and collar 28 and pins 26 are negligibly insignificant with respect to the biasing force of spring 38.

Referring to FIGS. 7-10, a modification of the hose coupling of this invention includes a tubular body 76 having a nose portion 78 at its forward end, a middle portion 80 adjacent the rearward end of nose portion 78, and a rear portion 82 at the rearward end of body 76. Nose portion 78 includes an annular groove 84, slanted slots 86, and elongated pins 88 which are similar to groove 52, slots 24, and pins 26, respectively, of FIGS. 1–6.

Middle portion 80 is substantially cylindrical in shape with a pair of flats 90 cut at its forward end. The diameter of middle portion 80 is slightly greater than the diameter of nose portion 78 so that the forward end of middle portion 80 forms a forwardly presented shoulder 92 adjacent the rearward end of nose portion 78. Flats 90 form rectangular planes which are tangent to the cylindrical surface of nose portion 78 at points adjacent the extreme rearward edges of slots 86. At the rearward end of flats 90 is a forwardly presented shoulder 94.

A cylindrical guide collar 96 is slidably mounted for axial movement on body 76. Collar 96 includes a pair of side wall portions 98 similar to side wall portions 36 shown in FIGS. 1–6, and a bore 102 (FIG. 10) which conforms to middle portion 80 such that collar 96 is adapted to slide axially thereon. Bore 102 is provided with a pair of flat surfaces 106 adapted to slidably engage flats 90 of middle portion 80 so as to prevent rotational movement of guide collar 96 as it slides axially on middle portion 80.

A helical spring 108 similar to spring 38 shown in FIGS. 1–6 biases guide collar 96 forwardly against pins 88 to hold pins 88 in their inner position within slots 86. Collar 96 is yieldably movable from a forward position as shown in FIGS. 7 and 8 to a rearward position corresponding to the outer position of pins 88 with respect to slots 86. When collar 96 is in its forward position a small portion of each flat surface 106 is in overlying relation to one of flats 90 of middle portion 80 (FIG. 8). This assures that collar 96 is prevented from rotational movement in its forward as well as its rear position.

Flats 90 and flat surfaces 106 provide an advantageous result from a manufacturing standpoint. The flat surfaces can be formed during the initial shaping process of collar 96 and body 76, thereby eliminating the manufacturing step of attaching a keypin to body 76 as is necessary in the modification shown in FIGS. 1–6.

It will be apparent from the foregoing that one of the advantages of the novel hose coupling is the substantially friction-free movement of the locking pins 26 out of engagement with male coupler element 56 during detachment of the male coupler from tubular body 12. As movement of sleeve 42 does not require any significant force necessary to overcome pin friction, operation of the coupling is greatly facilitated.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A hose coupling for a male coupler element comprising a tubular body having a longitudinally extending bore formed to receptively engage said male coupler, said tubular body having at least one through slot formed in the outer surface thereof and extending axially along said body and radially inwardly to said bore, at least one pin movably mounted in said slot for movement into said bore, actuating means provided on said tubular body for moving said pin out of said bore, guide means provided on said tubular body for urging said pin into said bore and resilient biasing means engageable with said guide means to bias said guide means against said pin, said guide means being displaceably movable along the axis of said tubular body and formed to abuttingly engage said actuating means when said actuating means moves said pin out of said bore, the abutment of said actuating means and said guide means isolating said pin from the biasing force of said biasing means when said actuating means move said pin out of said bore.

2. A hose coupling as claimed in claim 1 wherein said tubular body includes two of said through slots, said slots being oppositely disposed.

3. A hose coupling as claimed in claim 2 wherein a pin is movably mounted in each said through slot.

4. A hose coupling as claimed in claim 1 wherein said guide means comprise a guide collar having a guide channel for accommodating said pin.

5. A hose coupling as claimed in claim 4 wherein said pin is recessed within said guide channel during movement of said actuating means against said guide collar isolated.

6. A hose coupling as claimed in claim 4 wherein said guide channel is defined by spaced and oppositely disposed wall portions on said guide collar at opposite ends of said pin.

7. A hose coupling as claimed in claim 6 wherein said wall portions project from said guide collar a distance that is dimensionally greater than the diameter of said pin such that said pin can be recessed entirely within said guide channel.

8. A hose coupling as claimed in claim 7 wherein said actuating means comprise a sleeve slidably mounted on said tubular body for displacement thereon, said sleeve having an internal shoulder formed to abut against the wall portions of said guide means when said actuating means moves said pin out of said bore.

9. A hose coupling as claimed in claim 1 further including complementary engaging means on said guide means member and said tubular body member for preventing rotational movement of said guide means with respect to said tubular body.

10. The hose coupling of claim 9 wherein said engaging means includes a keypin and keyslot, said keypin being provided on one of said members and said keyslot being provided on the other said member.

11. The hose coupling of claim 9 wherein said engaging means includes complementary flat surfaces on said guide means and said tubular body.

12. In combination a tubular body having a longitudinally extending bore and a pair of oppositely disposed through slots formed in the outer surface thereof and extending axially along said tubular body and radially inwardly to said bore, a pin movably mounted in each said slot for movement into said bore, a guide collar provided on said tubular body for engagement with said pins to move said pins into said bore, said guide collar being displaceably movable along the axis of said tubular body and including a guide channel for accommodating said pins, said guide channel being defined by spaced and oppositely disposed wall portions on said collar extending away from said collar, each wall portion having a free end at a greater distance from the collar than the diameter of said pins, such that said pins can be entirely recessed within said guide channel, and biasing means on said tubular body engageable with said guide collar for urging said guide collar to move said pins into said bore, and actuating means to move said pins out of said bore.

* * * * *